United States Patent
Kawamura

[11] Patent Number: 5,881,559
[45] Date of Patent: Mar. 16, 1999

[54] HYBRID ELECTRIC VEHICLE

[75] Inventor: Hideo Kawamura, Samukawa-machi, Japan

[73] Assignee: Isuzu Ceramics Research Institute Co., Ltd., Kanagawa, Japan

[21] Appl. No.: 686,645

[22] Filed: Jul. 26, 1996

[30] Foreign Application Priority Data

| Jul. 28, 1995 | [JP] | Japan | 7-193724 |
| Jul. 28, 1995 | [JP] | Japan | 7-193725 |
| Aug. 24, 1995 | [JP] | Japan | 7-216145 |
| Aug. 31, 1995 | [JP] | Japan | 7-224027 |

[51] Int. Cl.$^6$ ............ F02B 37/04; B60L 11/02
[52] U.S. Cl. ........... 60/59.7; 60/608; 123/192.2; 123/276; 180/65.4; 290/1 C; 310/83
[58] Field of Search ............ 60/597, 607, 608; 680/65.2, 65.4, 65.6, 65.8; 290/1 C

[56] References Cited

U.S. PATENT DOCUMENTS

| 4,296,724 | 10/1981 | Iizuka et al. |
| 4,585,949 | 4/1986 | Takahashi ............. 290/1 C |
| 4,756,377 | 7/1988 | Kawamura et al. |
| 5,079,913 | 1/1992 | Kishishita ............. 60/597 |
| 5,105,624 | 4/1992 | Kawamura ............. 60/608 |
| 5,368,000 | 11/1994 | Koziara |

FOREIGN PATENT DOCUMENTS

| 0 233 079 | 8/1987 | European Pat. Off. |
| 0 621 402 | 10/1994 | European Pat. Off. |
| 44 44 545 | 6/1995 | Germany |

Primary Examiner—Michael Koczo
Attorney, Agent, or Firm—Staas & Halsey

[57] ABSTRACT

A hybrid electric vehicle which is driven by a motor powered with electric power generated by an engine, wherein the cylinder, piston, and sub-combustion chamber of the engine have insulation structure so that heat sufficient for evaporating fed fuel is held in the sub-combustion chamber. The sub-combustion chamber having a central communicating orifice is formed on the central portion of the piston head, a fuel collision table is formed in the sub-combustion chamber, and a plurality of radial communicating orifices for jetting flame from the sub-combustion chamber against the cylinder is provided, the burning is easy even with using a low pressure fuel injection mechanism, therefore a solenoid valve type injection pump with simple structure is used, the burning is smooth with using alcohol fuel such as methanol and ethanol, the fuel injection timing is adjusted dependently on load to the optimal timing, the number of working cylinders is controlled so as to match to the load, the control allows the engine to operate at the optimal fuel consumption, therefore emission of hazardous substance contained in exhaust gas is minimized. The engine of the present invention needs no cooling mechanism, and also needs no heavy gear box and no clutch mechanism, the weight of the whole vehicle is significantly reduced comparing with conventional vehicles, the fuel consumption is reduced also in terms of the light weight.

8 Claims, 11 Drawing Sheets

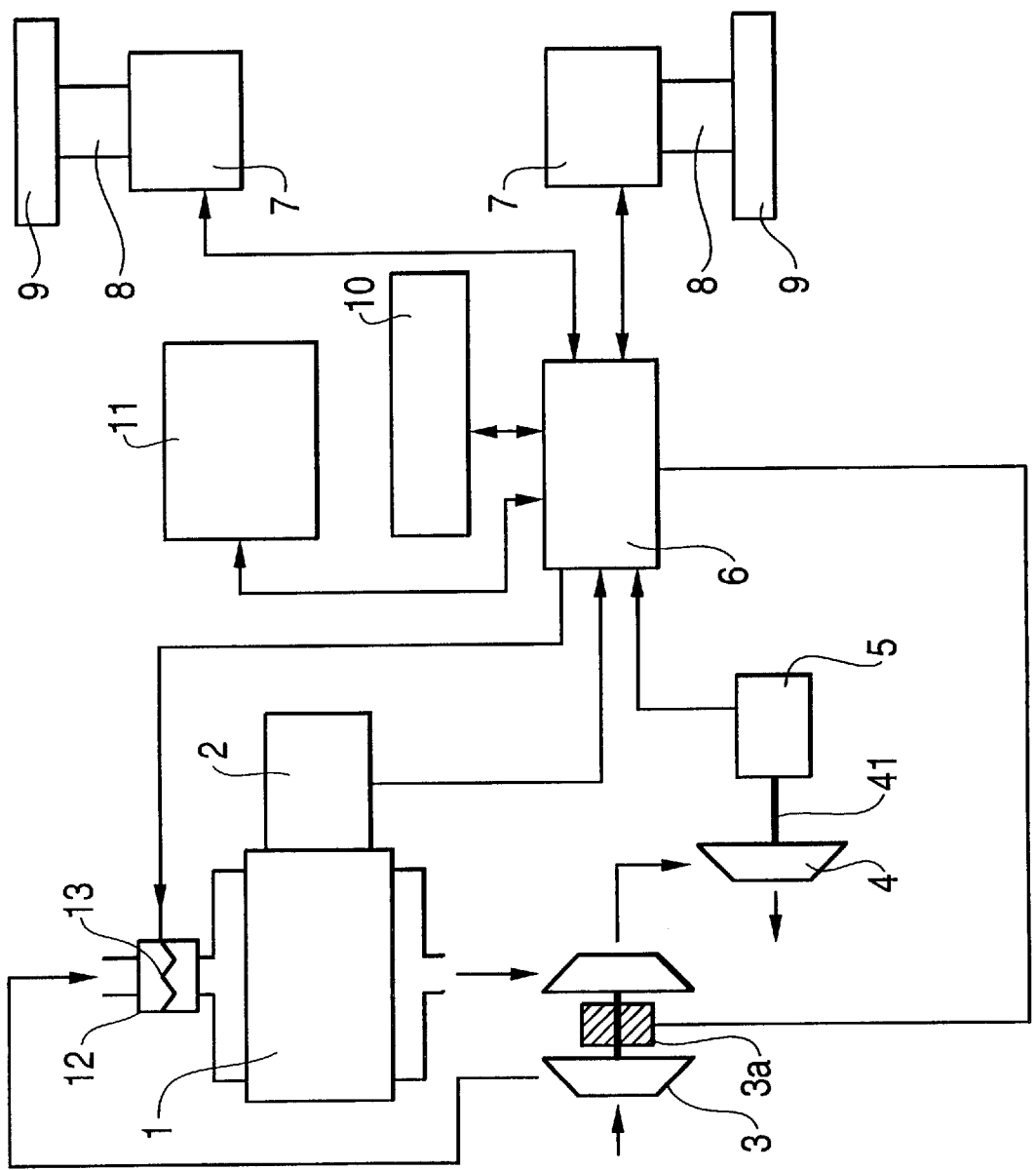

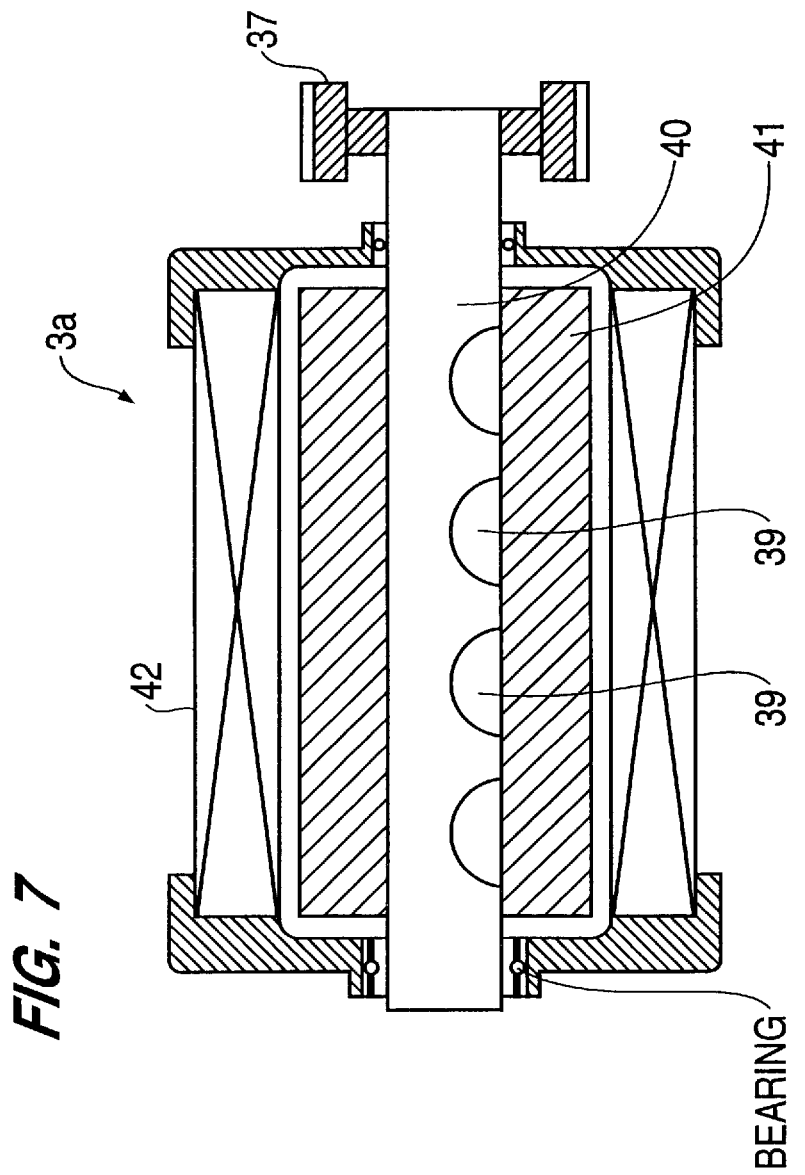

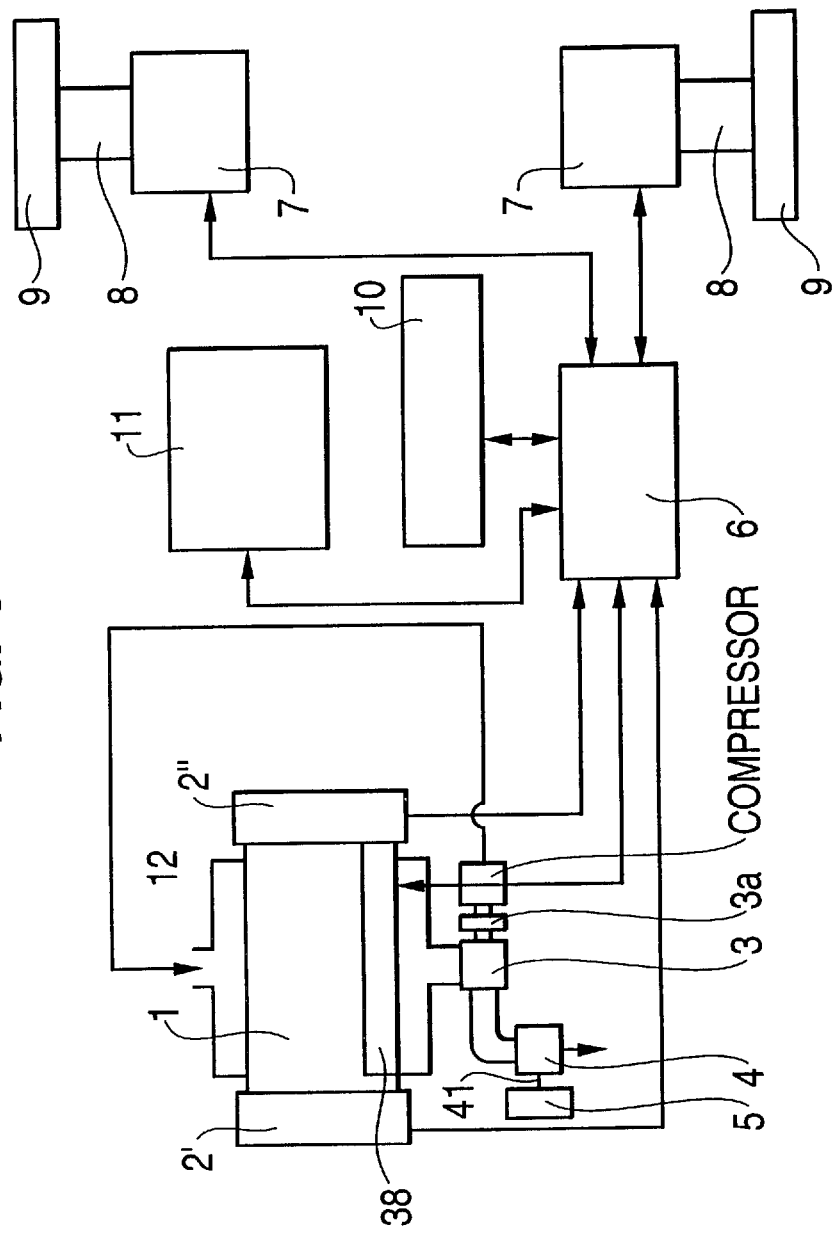

HYBRID ELECTRIC VEHICLE

FIELD OF THE INVENTION

This invention relates to a hybrid electric vehicle powered with electric power generated by a generator coupled to the output shaft of an engine. This invention relates, more particularly, to a hybrid electric vehicle powered with electric power generated by a generator coupled to the output shaft of the engine capable of recovering energy in exhaust gas.

DESCRIPTION OF THE PRIOR ART

As a hybrid electric vehicle powered with electric power generated by a generator coupled to the output shaft of an engine, a hybrid electric vehicle shown in FIG. 13 has been widely known. The hybrid electric vehicle shown in FIG. 13 operates the engine 51 under the condition for high efficiency and low air pollution contaminant concentration in exhaust gas to drive the generator 52. Power generated by the generator 52 is charged in a battery 54 and also fed to a motor 55 through a controller 53. The motor 55 drives wheels 57 of the vehicle through a differential gear 56. In general, such an electric vehicle is structured so that generated output power from the generator 52 is supplied as the power needed for constant speed running of the vehicle, and when more power is needed for acceleration or climbing, power is supplied from both the generator 52 and battery 54. However, when the generator output of the generator 52 is affordable, power is supplied to charge the battery 54.

In the case of the above-mentioned conventional hybrid electric vehicle, there are drawbacks in that the engine is a water cooling engine or a gasoline engine and thermal energy in exhaust gas is not recovered, whereby energy efficiency is decreased.

In the case of the above-mentioned conventional hybrid power source, the power source is disadvantageous in that a generator is provided only on one end of the output shaft of the engine, and therefore the load exerted on the output shaft becomes unbalanced, resulting in the occurrence of early wearing and deterioration of bearings of the output shaft, thus the life of the engine is short.

Further in relation to the problem described herein above, the size and weight of the generator is limited, therefore it is disadvantageous also in that a generator having only limited output power relative to the output of the engine is installed.

In addition, currently the word "vehicle" refers usually to vehicles which use a fossil-fueled internal combustion engine as a prime mover, though the thermal efficiency of an internal combustion engine of such vehicles has been improved, much effort to reduce emission environmental pollution has been made to improve the efficiency. On the other hand, when the supply of fossil fuel is short, the use of renewable methanol and ethanol as an energy resource would be unavoidable. Such a global situation will be realized in the near future, and to cope with such a situation, the use of renewable methanol and ethanol attracts attention. In Europe, such renewable methanol and ethanol are in limited use, internal combustion engines used for methanol and ethanol have a cooling mechanism like conventional internal combustion engines, therefore the fuel evaporates and burns inefficiently; this type of engine is not suitable for these renewable fuels.

In view of rotation-torque characteristics of a reciprocal piston internal combustion engine, that is, torque is low at a low speed range, high at an intermediate speed range, and low at a high speed range, a vehicle which is provided with such an internal combustion engine needs a gear box and clutch mechanism. Essentially, the gear box and clutch mechanism are heavy in weight and need a large space, and result in a heavy and large sized vehicle.

As described hereinabove, conventional and current vehicles are disadvantageous in that fuel consumption is high and exhaust gas contains much hazardous substances and also vehicle weight is high.

SUMMARY OF THE INVENTION

It is the primary object of the present invention to provide a hybrid electric vehicle driven by a motor powered with electric power generated by an engine which is capable of recovering energy exhausted from the engine to improve thermal efficiency.

It is another object of the present invention to provide a hybrid electric vehicle as described above which accommodates properly a generator with balanced engine load.

It is a further object of the present invention to provide a hybrid electric vehicle which is capable of accommodating a maximum sized generator in a narrow engine room space of the vehicle.

It is yet a further object of the present invention to provide a hybrid electric vehicle which uses no fossil fuel to thus reduce air pollution.

To achieve the objects of the present invention, the present invention provides a hybrid electric vehicle provided with an engine, a main generator driven by the engine to generate electric power, a motor provided on a drive shaft of wheels and powered with electric power generated by the main generator, and a controller for controlling the motor, wherein the engine has a combustion chamber insulation means consisting of ceramics such as silicon nitride for increasing enthalpy of exhaust gas, an exhaust pipe having a turbo-charger and energy recovery turbine, a sub-generator having permanent magnets as the rotor is provided on the shaft of the turbine and cylinder switching means for controlling the number of working cylinders of the engine is provided. The controller controls a load detection means for detecting loading on the engine and the cylinder switching means corresponds to an output from the load detection means. In the present invention, the combustion chamber has a thermally insulated structure as described hereinabove to prevent the heat from releasing to cooling water unlike conventional engines, and the enthalpy of exhaust gas is increased, and also the exhaust port and exhaust pipe are structured and thermally insulated, a turbo-charger having a high speed motor and an energy recovery turbine are provided in the exhaust pipe in series to recover thermal energy from exhaust gas, therefore the efficiency of the engine is significantly improved. High efficiency of the engine is required for this hybrid system over the wide range of loading from partial load to full load, therefore the engine is structured so that the number of working cylinders is controlled dependently on loading on the engine, thus the engine is operated always at the maximum efficiency.

The present invention provides a hybrid electric vehicle provided with an engine, a main generator driven by the engine to generate electric power, a motor powered with electric power generated by the main generator and provided on a drive shaft of wheels, and a controller for controlling the motor, wherein the engine is powered with methanol fuel. The engine is provided with a combustion chamber insulation means consisting of ceramics such as silicon nitride for increasing enthalpy of the exhaust gas, a catalyst for reforming methanol to dimethyl-ether with high cetane number in the intake pipe, and a heater for heating the catalyst. The exhaust pipe is provided with a turbo-charger and an energy recovery turbine, a turbo-charger generator having a permanent magnet as the rotor is provided on the shaft of the turbo-charger, and a sub-generator having a permanent magnet as the rotor is provided on the output shaft of the turbine. As described hereinabove, in this invention, methanol is used as a fuel for the engine. The combustion chamber has a thermal insulation structure. Enthalpy of the exhaust gas is increased. A turbo-charger and energy recovery turbine are provided in the exhaust pipe to recover thermal energy from the exhaust pipe. Also, a catalyst is provided in the intake pipe of the engine to reform methanol to dimethyl-ether with a high cetane number, therefore the efficiency of the engine is significantly improved, and the combustion is greatly improved, thus the low-pollution vehicle is realized.

Further, the present invention provides a hybrid electric vehicle provided with an engine and generator driven by the engine to generate electric power, and which releases power directly and indirectly through a battery, wherein methanol is used as fuel for the engine, the engine is provided with a combustion chamber consisting of ceramics such as silicon nitride and a combustion chamber insulation means having a insulation layer on the outside of the combustion chamber, the main generators are provided on both ends of a crank shaft of the engine, and a controller for merging power outputs from the main generators and the energy recovery generator connected to the exhaust pipe and for driving the motor-generator coupled with the drive shaft of the vehicle is provided.

Yet further, the present invention provides a hybrid electric vehicle provided with an engine, a generator driven by the engine to generate electric power, a generator powered with recovered energy from exhaust gas, a motor powered with electric power generated by the generators and coupled with the drive shaft of wheels, and a controller for controlling the motor, wherein a capacitor and battery are provided for storing electric power from the generators connected to the engine and from the motor coupled with the wheels.

In this invention, the first and second motor-generators having a permanent magnet rotor are provided on both ends of the crank shaft of the reciprocal multiple cylinder engine, therefore the load on the output shaft of the engine is balanced, and the balanced load leads to reduced vibration of the engine, reduced wear and deterioration of the bearings of the output shaft, and long service life of the engine. For a four-cylinder engine, the secondary unbalance during reciprocation period causes vibration of the engine, and to cope with the vibration, in some cases, the side wall of a cylinder body is provided with a double speed unbalance shaft to absorb vibration. The unbalanced shaft rotates at a speed double the rotation speed of the engine, therefore the use of the shaft for the generator-motor leads to not only increased electric generation while the engine is operated at low speed but also absorption of the above-mentioned unbalanced vibration. The engine is provided with a turbo-compound system on the exhaust system, therefore the engine has generators with three levels of speed including the generator with high speed, secondary balanced shaft with intermediate speed, and engine crank shaft with low speed, this structure favors the engine for continuous high efficiency operation. In general, the operational efficienly of generators and motors is higher as the rotational speed is nearer to the rated rotational speed, the operation at the rotational speed which gives high efficiency leads to the efficient use of energy. For example, when an engine is operated at low speed, a generator coupled with the double speed unbalanced shaft is operated at high efficiency, and on the other hand when the engine is operated at full speed, a generator coupled with the turbo-compound system is operated at high efficiency and also a generator coupled with the crank shaft is operated at high efficiency. The installation of these generators with different rotational speeds leads to the high efficiency conversion of the engine power to electric power.

As described hereinabove, the combustion chamber of the engine consists of a thermal insulation material such as ceramics. Therefore a cooling system of the engine is not needed, the structure of the engine is simplified, energy concentrated in the exhaust system is converted to power, and the engine is made light in weight and small in size. Generators are provided on both sides of the output shaft of the engine, therefore the structure of the hybrid power source is simplified and the efficiency is improved.

The present invention provides a hybrid electric vehicle provided with a engine having a structure in which a piston has a sub-combustion chamber, a fuel injection nozzle is provided on the cylinder head, fuel from the injection nozzle is sprayed through the central communicating orifice with a small diameter provided on the top of the sub-chamber, the sub-combustion chamber is provided with fuel collision table in the internal thereof and formed of thermal insulation structure around the chamber, a plurality of radial communicating orifices is provided on the head of the piston to spread fire generated in the sub-combustion chamber to the direction of the cylinder side wall. The cylinder and the outside of the combustion chamber of the upper side of the cylinder are formed of a thermal insulation structure. A generator is coupled with the output shaft of the engine. A motor fed with electric power from the generator drives the wheels. An energy recovery means recovers exhaust energy included in exhaust gas from the engine in a form of electric power. The first storage means stores instantaneous surplus power generated from the generator-motor of the vehicle and releases the power to the electric system. The second storage means stores redundant surplus power generated by the generator and releases redundantly the power to the electric system. A super-charging device is driven by the electric system in the vehicle to super-charge the engine. A controller controls the power frequency and current dependently on the characteristics of the motor. In this invention, the generators loaded on both ends of the output shaft of the engine are optionally disconnectable, the generator is connected to the turbine as an exhaust recovery device, and the fuel energy is recovered sufficiently. The engine is operated with alcohol fuel, the inlet valves and exhaust valves are operated electro-magnetically, the sub-combustion chamber provided on the piston head of the internal combustion engine is formed at the center of the piston head, the fuel pump of the engine is operated electro-magnetically and provided on each cylinder, and the fuel distributor feeds fuel to only working cylinders. The engine has a plurality of cylinders, the number of working cylinders is controlled depending on the engine load, each cylinder is operated in the optimal fuel consumption range. A rotation sensor and load sensor are mounted on the output shaft of the engine for detecting rotation speed and load on the shaft, and at least the number of working cylinders and the operation timing of the inlet valves and exhaust valves are controlled by the signal generated from the rotation sensor.

BRIEF DESCRIPTION OF THE DRAWINGS

FIG. 5 is a block diagram illustrating the structure of another embodiment of the present invention.

FIG. 7 is a cross-sectional view of the motor-generator used in the embodiment of the present invention.

FIG. 8 is a block diagram illustrating the structure of yet another embodiment of the present invention.

DESCRIPTION OF THE PREFERRED EMBODIMENTS

Figure 1:
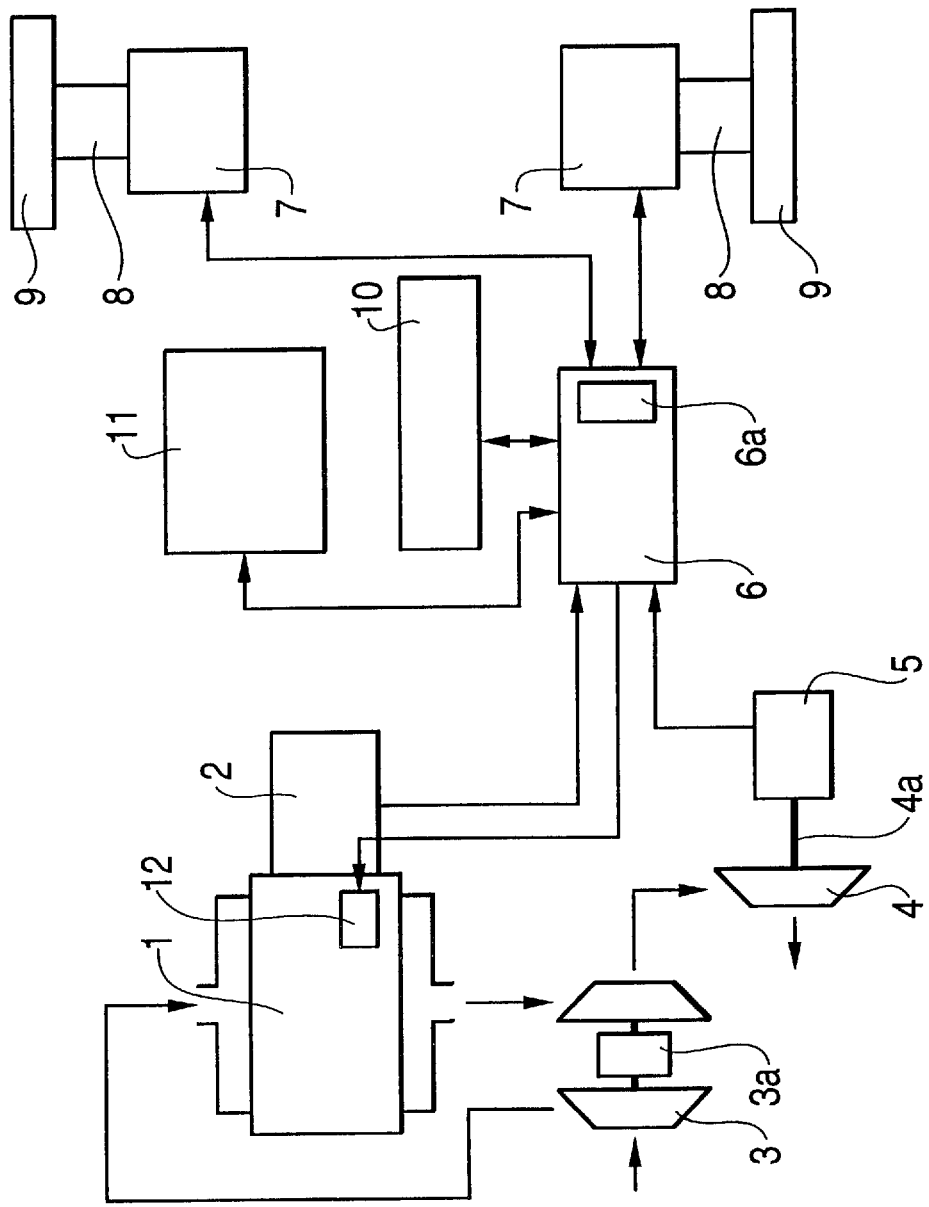
FIG. 1 is a block diagram illustrating the whole structure of the present invention.

Embodiments of the present invention are described in detail hereinafter, with reference to the drawings. FIG. 1 shows the entire structure of the first embodiment. In FIG. 1, the numeral 1 represents a diesel engine in many cases, the combustion chamber of the engine 1 is formed of ceramics such as silicon nitride and insulated with insulation layers provided on the outside and outer peripheral surface of the exhaust outlet wall. The numeral 2 represents a main generator that obtains a magnetic field using a permanent magnet moving at a speed increased by a planetary gear or has the permanent magnet rotor. The numeral 3 represents a turbo-charger provided in the exhaust pipe of the engine 1 and having a motor-generator 3a on its rotation shaft; this is a widely known device for compressing air intake by thermal energy in exhaust gas from the engine 1. The numeral 4 represents a turbine driven by thermal energy of exhaust gas from the engine 1, a sub-generator 5 is provided on the output shaft 4a thereof. The motor-generator 3a and sub-generator 5 are both permanent magnet type generators having permanent magnet rotors.

Output power generated by the main generator 2, motor-generator 3a, and sub-generator 5 is controlled by a controller 6 so as to be the same voltage, the frequency is adjusted to a prescribed value by an inverter 6a, thus the output power is regulated suitably for driving axle shafts, and is supplied to motors 7. When surplus power is available, power is controlled to be fed to a capacitor 10 and battery 11. The controller 6 also controls a cylinder control actuator 12 provided on the engine 1. The control will be described hereinafter.

The motors 7 drive wheels 9 respectively through reduction gears 8.

Figure 2:
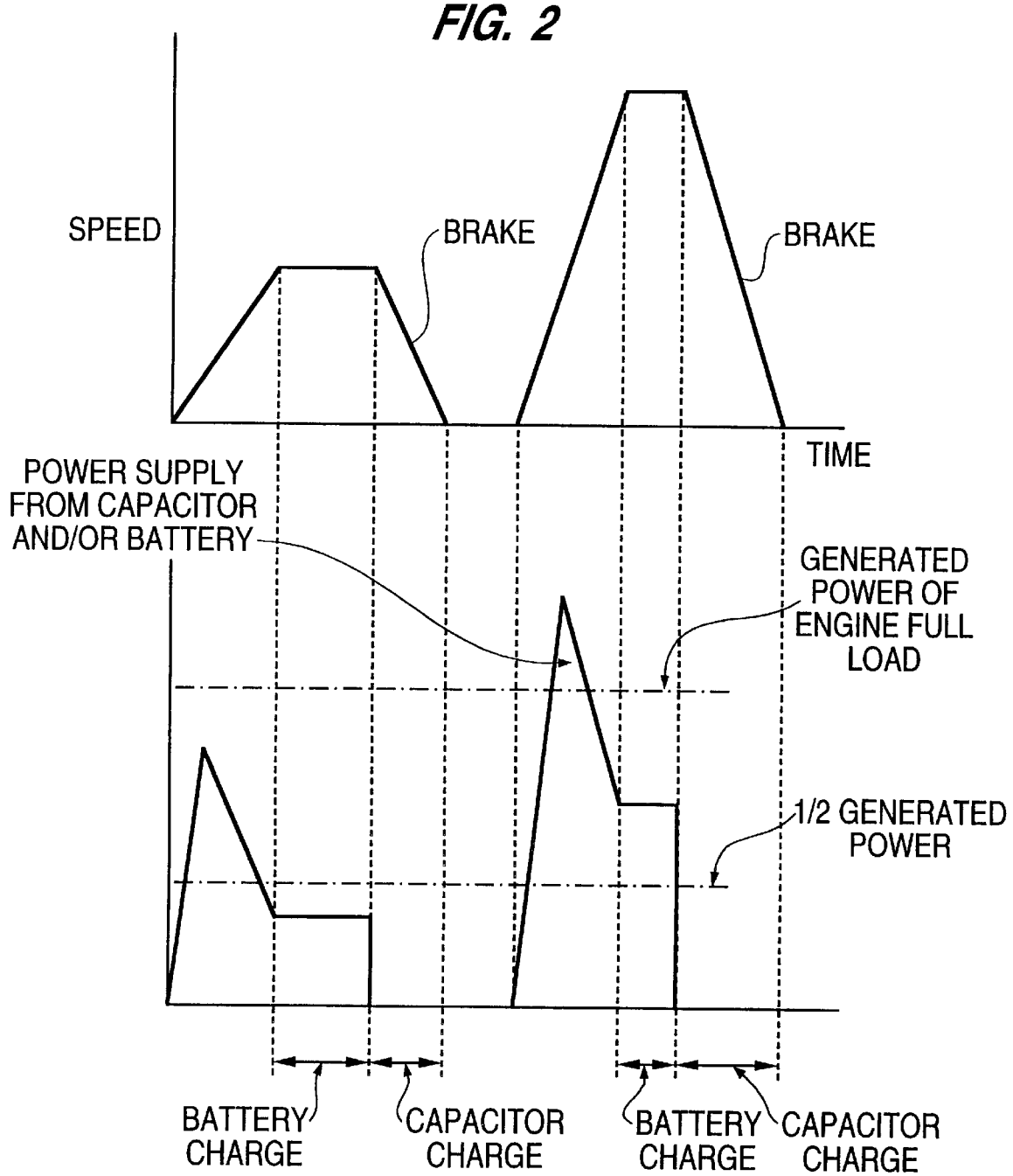
FIG. 2 is a conceptual diagram illustrating the control concept of the present invention.

FIG. 2 is a figure illustrating the concept of operation of the first embodiment. Operations in the embodiment are described referring to FIG. 1 and FIG. 2. The operation of a vehicle is a repetition of acceleration, running at constant speed, deceleration, and stopping. FIG. 2 represents a simplified operation of a vehicle. In FIG. 2, a operation pattern comprising acceleration at low speed, running at a constant speed, and deceleration, and another operation pattern comprising acceleration at high speed, running at a constant speed, and deceleration are shown.

Power supplied to the motors 7, namely the driving force of the motors 7, is shown at the bottom of the figure respectively for each pattern.

Usually, the axle shaft motors 7 need more power for acceleration than when running at a constant speed. The total full output power generation by the main generator 2, motor-generator 3a, and sub-generator 5 in this embodiment is prescribed to a value smaller than the total power needed for acceleration as shown in FIG. 2. To supply output power needed for acceleration, a very large engine is necessary. To avoid the use of such a large engine, the under power for acceleration is controlled by the controller 6 to supply the power from the capacitor 10 and/or battery 11. When the motors 7 are in high loaded condition such as acceleration or climbing and full parallel operation of the main generator 2, motor-generator 3a, and sub-generator 5 is insufficient for continuous acceleration or climbing. First the capacitor 10 supplies the deficient power if the capacitor is charged and ready for discharging, or if the capacitor 10 is insufficiently charged and not ready for discharging, the battery 11 supplies the deficient power. The capacitor 10 is charged during deceleration, that is, the main generator 2, and/or motor-generator 3a, and sub-generator 5 are operated and also the motors 7 are operated regeneratively as a generator to regenerate braking power to charge the capacitor 10. The regenerative operation of the motors 7 is served as a function that is called engine brake. The battery 11 is charged during constant speed running if surplus power from the main generator 2 and/or motor-generator 3a, and sub-generator 5 is available. Next, the number of cylinder switching control is described. The cylinder control actuator 12 controls the cylinders to stop the motion of some cylinders when required power for the motors 7 is small and the work per cylinder is increased because frictional loss due to intake and exhaust motion of the reciprocal engine is large, and the loss is reduced and fuel consumption is improved. Then, the number of working cylinders is reduced to a half. In detail, intake and exhaust valves of non-working cylinders are maintained closed to reduce the number of working cylinders. This control is exerted when required power for the motors 7 is lower than power generation of the half cylinder operation during constant speed running as shown in the bottom figure in FIG. 2 for low speed pattern.

Figure 3:
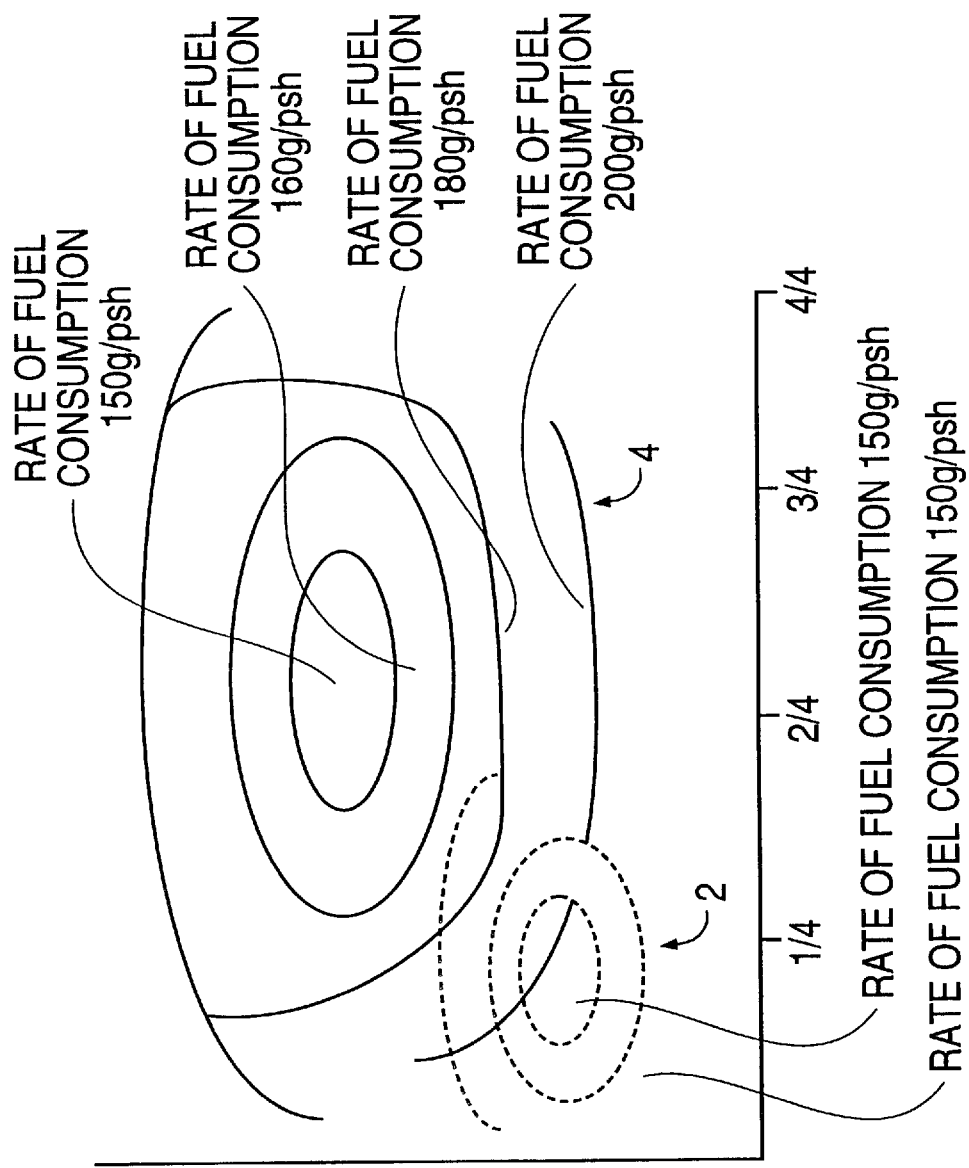
FIG. 3 is a conceptual diagram illustrating the cylinder control of the engine of the present invention.

The load-engine torque characteristics of the engine 1 when the cylinders are controlled is shown in FIG. 3. FIG. 3 shows an exemplary characteristic of a four-cylinder engine. In the case of a four-cylinder engine, the fuel consumption is optimal in an engine load range of $2/4$ to $3/4$, and in a generated torque range of around $2/3$ of the maximum torque. That creates the highest engine efficiency. Therefore, it is desirable that the engine of the hybrid electric vehicle is always operated in this range for high efficiency. However, because the actual load fluctuates to a large extent depending on the required power for the motors 7 as shown in FIG. 2, it is difficult to always operate in the optimal efficiency range. To cope with this difficulty, in the embodiment of the present invention, the engine load is monitored, and when the engine load is low, the engine is controlled to be operated using two cylinders.

Figure 4A:
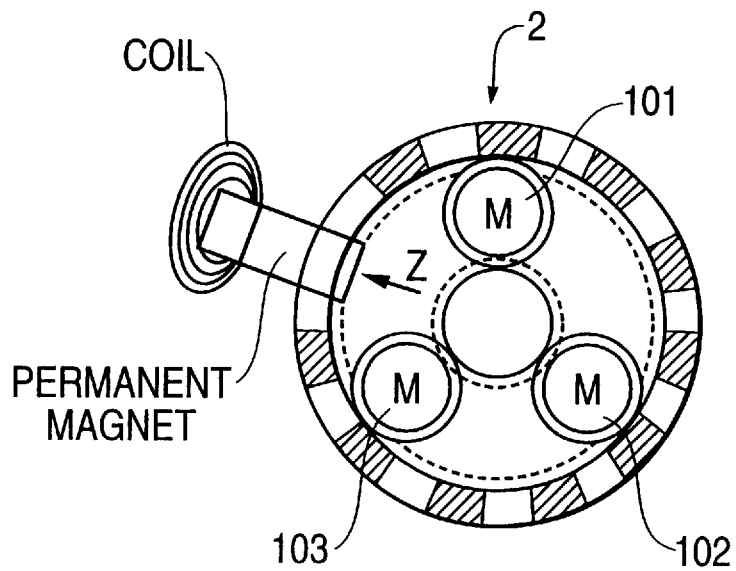
FIGS. 4A and 4B are diagrams illustrating the structure of the main generator of the present invention.
Figure 4B:
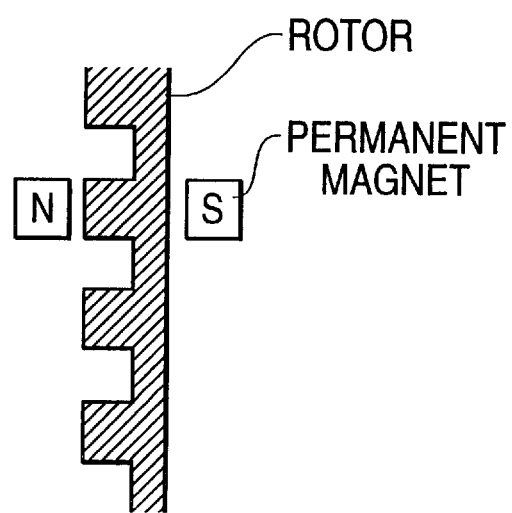

In FIG. 1, a structure where motors are provided for each driving wheel is shown. However, a structure in which wheels are driven through a differential gear may be selected as shown in the conventional embodiment. In the case that wheels are driven through a differential gear, a structure in which a planetary gear power transmission mechanism is provided between a driving shaft and a motor, a plurality of pinions of the planetary gear is provided, motors provided for each pinion may be selected. In this case, the number of working motors is controlled depending on the running load to operate the engine at the optimal efficiency range in the rotational speed of the motor and output characteristics. As shown in FIGS. 4A and 4B, the planetary gear is used for the main generator 2, with the size of the planetary gear being prescribed to the minimum size. In such a structure, the transmitted power from the crank shaft C is transmitted to the peripheral gear and rotated. The radius of the rotor is large, the periphery of the rotor is formed in the shape of a stepwise rectangular wave form, permanent magnets are placed with the rotor therebetween, the magnetic field is passed and shut alternately, and electric power is generated in a coil wound on the permanent magnet circuit. Small motors M are mounted on the planetary gears 21 to 23 to generate electric power.

In this embodiment, the combustion chamber of the engine has a thermal insulation structure that increases enthalpy of that exhaust gas. A turbo-charger and energy recovery turbine are provided in the exhaust pipe to recover thermal energy of the exhaust gas, therefore the efficiency of the engine is greatly improved. The number of working cylinders is controlled depending on the loading condition of the engine, therefore the engine is always operated at optimal efficiency.

Next, an embodiment in which methanol is used as fuel, and a reformer for reforming methanol fuel to a fuel with a high cetane number such as dimethyl-ether is provided in the air intake passage is described referring to FIG. 5. In FIG. 5, the same member as shown in FIG. 1 is provided with the same numeral, and description is omitted. In FIG. 5, the numeral 14 represents a catalyst and the numeral 13 represents an electric heater for heating the catalyst 14. The electric heater 13 is supplied with electric power by the controller 6 when the temperature of the engine is low. The thermal insulation structure of the combustion chamber of the engine favors combustion of methanol with a low cetane number because of high temperature of the wall. However, when the atmospheric temperature is low, the wall temperature does not rises when the engine operation is started, and methanol burns incompletely. When, methanol is reformed partially to dimethyl-ether using the catalyst and heater by about 10%, the cetane number is significantly improved and diesel combustion is possible. By using this type of device, combustion over the full range is improved. After the temperature rising, reforming to dimethyl-ether proceeds sufficiently, and the engine functions as a wall firing diesel engine.

In this embodiment, methanol is used as fuel for the engine, the thermal insulation structure is provided to the combustion chamber of the engine to increase the enthalpy of the exhaust gas, and the turbo-charger and energy recovery turbine are provided in the exhaust pipe to recover thermal energy from the exhaust gas. Therefore, the efficiency of the engine is improved to a large extent. In addition, the catalyst for reforming methanol to dimethyl-ether with a high cetane number is mounted in the air intake passage of the engine, thus improving the combustion to a large extent, and a low-pollution hybrid electric vehicle is realized.

Figure 6A:
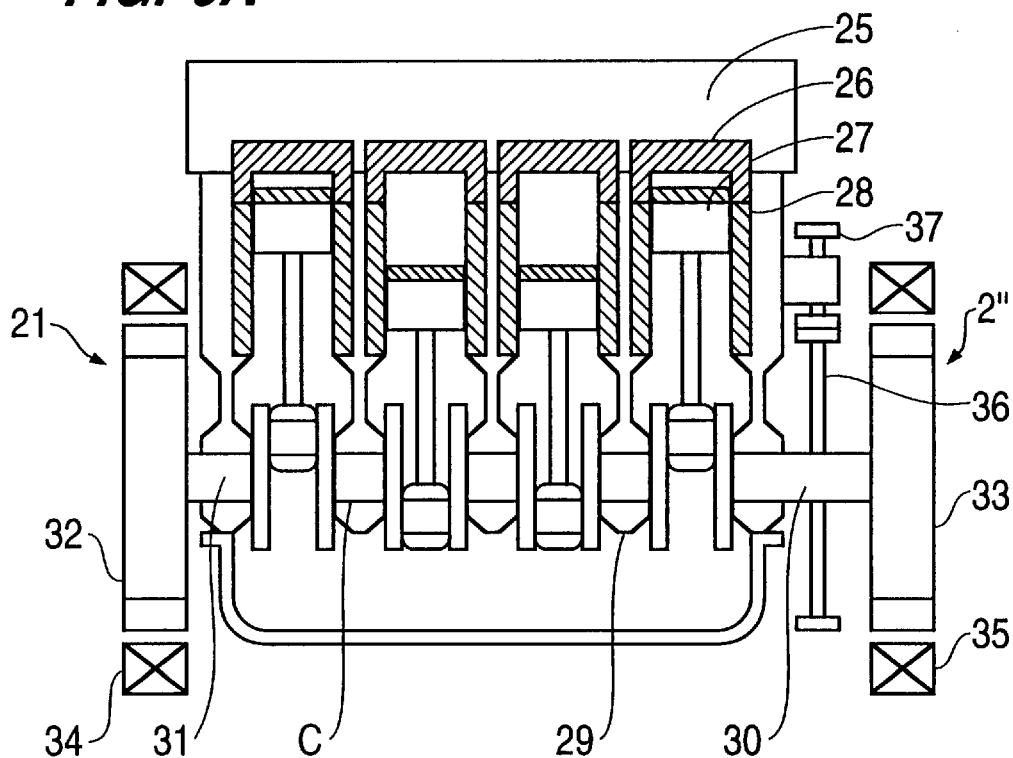
FIGS. 6A and 6B are schematic diagrams illustrating the structure of the engine used in the present invention.
Figure 6B:
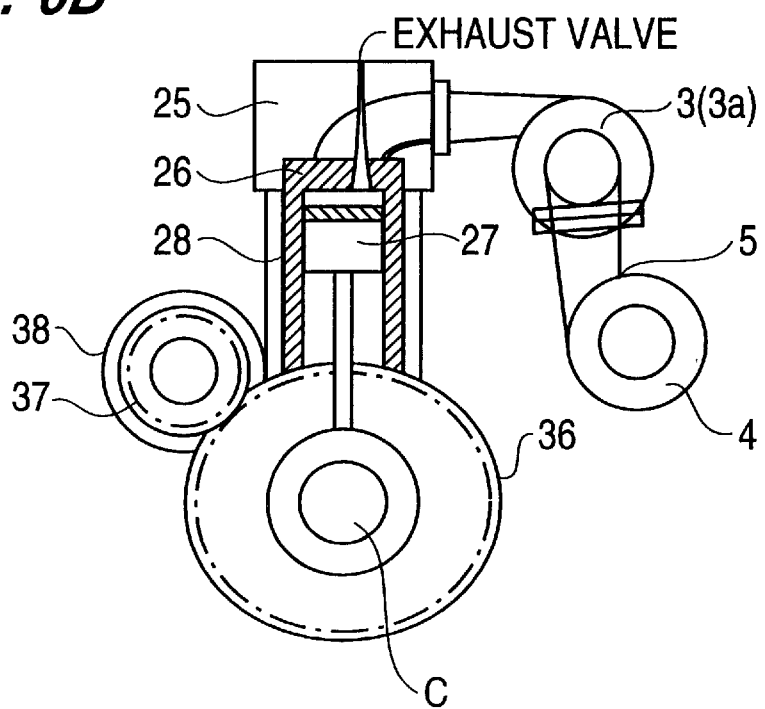

Next, an embodiment of an engine used preferably for the hybrid electric vehicle shown in FIG. 1 is described in detail referring to the drawings. FIGS. 6A and 6B show the structure, FIG. 7 is a side view of the engine, and FIG. 8 is a block diagram illustrating the whole structure of this embodiment. In FIGS. 6A and 6B, the numeral 25 represents the cylinder head consisting of cast aluminum or cast iron, and the head liner 26 consisting of ceramics such as silicon nitride is engaged to the combustion chamber. The numeral 27 represents a piston consisting of cast aluminum. The numeral 28 represents a cylinder liner consisting of ceramics such as silicon nitride engaged to the engine body. Other members such as a crank shaft C and control rod 29 are provided like a conventional engine. Generators 2' and 2" comprising permanent magnet rotors 32 and 33 and stators 34 and 35 respectively are provided on both ends 30 and 31 of the crank shaft C. The generator 2' and 2" are equivalent to the main generator 2 shown in FIG. 1. A large diameter gear 36 is mounted on one end 30 of the crank shaft C, the motor-generator 38 is connected to the large diameter gear through a small diameter gear 37. The gear ratio of the large diameter gear to the small diameter gear is 2:1. Therefore, the motor-generator 38 is rotated at a speed twice the rotational speed of the engine. The motor-generator 38 is added to the embodiment shown in FIG. 1.

As shown in FIG. 7, a shaft 40 having the small diameter gear 37 and unbalanced spaces 39 is provided to the motor-generator 38, a permanent magnet type rotor 41 is fixed on the shaft 40, and a stator 42 is provided with a gap interposed therebetween around the rotor 41. The unbalanced spaces 39 provided on the shaft 40 are provided so that an unbalanced force is exerted in the opposite direction to the motion of the piston 3 of the engine. Therefore, the unbalanced force reduces vibration and noise having a frequency twice the engine rotational speed or second order of the rotation.

Operations of the embodiment shown in FIGS. 6A, 6B, 7, and 8 are described hereinbelow. The operation of a vehicle is a repetition of acceleration, running at a constant speed, deceleration, and stopping. Usually, the motor 7 requires more power for acceleration than when running at a constant speed. Full generation power from the generators 2' and 2" is designed so as to be insufficient for acceleration. The under power for acceleration is supplied from the capacitor 10 and/or battery 11 under the control of the controller 6. When the motors 7 are loaded heavily, for example, for acceleration or climbing, though the generators 2' and 2" are operated at the full power, if the power is insufficient for the load, the under power is supplemented by the capacitor 10 when the capacitor 10 is charged and ready for power supply. If the capacitor is charged insufficiently and not ready for power supply, the under power is supplemented by the battery 11. The capacitor is charged during deceleration with power from generators 2' and 2" and also from the regenerative operation of the motors 7, that is, the motors 7 are operated as the generator to generate electric power for charging the capacitor. The regenerative operation of the motors 7 is served also as a function that is called engine brake. The battery 11 is charged while running at a constant speed and surplus power is available from the generators 2' and 2". The motor-generator 38 is operated as the generator when output power generated from the generators 2' and 2" is insufficient and power generated by the motor-generator 38 is supplied to supplement the under power. The motor-generator 38 is operated as the motor to supplement the insufficient output of the engine when the output of the engine is insufficient. The controller 6 controls the motor-generator 38.

In this embodiment, the first and second motor-generators having a permanent magnet rotor are provided on both ends of the crank shaft of the reciprocal multiple cylinder engine, therefore weight loaded on the output shaft of the engine is balanced. The balanced weight leads to reduced wear and deterioration of the bearing of the output shaft. Thus, the engine is provided with long life.

The combustion chamber of the engine is formed of insulation material such as ceramics, therefore a cooling system of the engine is needless, the engine is simplified, and such structure allows the engine to be light weight and small in size. The generators are provided on both ends of the crank shaft, the structure of the hybrid power source is simplified, and the efficiency is improved.

An embodiment of an engine used preferably for the hybrid electric vehicle shown in FIG. 1 is described in detail referring to FIGS. 9 to 12.

Figure 9:
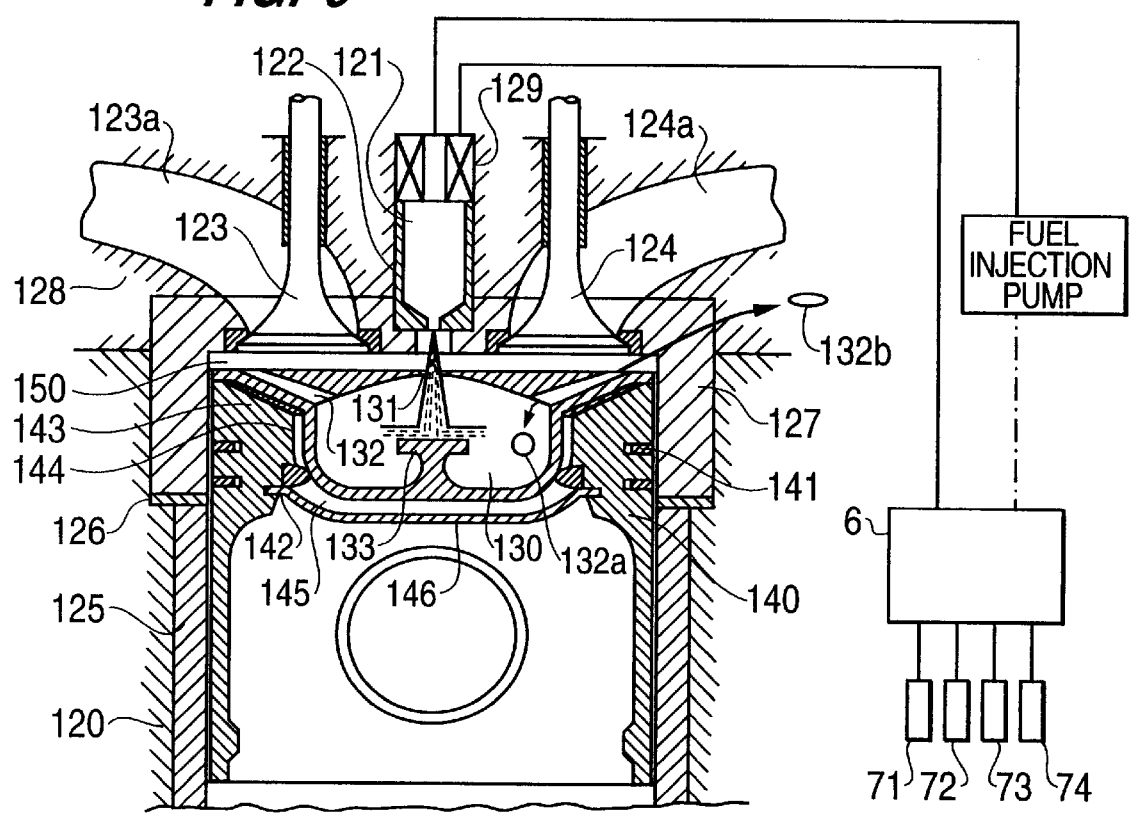
FIG. 9 is a cross-sectional view of the engine used in the present invention.
Figure 10:
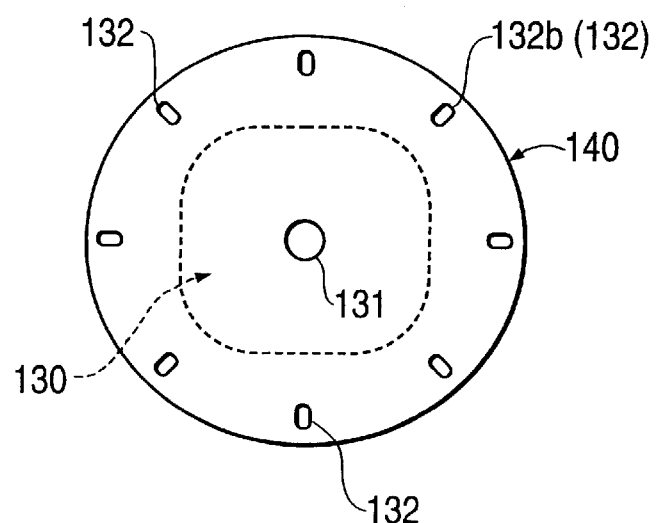
FIG. 10 is a plan view illustrating the top side of a piston of the engine used in the present invention.

FIG. 9 is a partial cross-sectional view for illustrating the cylinder structure of each cylinder of the engine 1 shown in FIGS. 1, 5, and 8. The cylinder liner 125 consisting of high strength and heat resistant ceramic such as silicon nitride is inserted inside the peripheral surface of the cylinder of the cylinder body 120. The cylinder head liner 127 is inserted with a gasket 126 interposed between the top of the cylinder liner 125 and the head liner 127. The cylinder head liner 127 also consists of high strength and heat resistant ceramics such as silicon nitride. The numeral 128 represents the cylinder head provided above the cylinder body 120. The numeral 140 represents the piston, which is contained in the cylinder liner 125 and cylinder head liner 127 and moves slidably in the vertical direction corresponding to the motion of the engine. Piston rings 141 are engaged on the sliding portion of the piston 140.

The numeral 130 represents the sub-combustion chamber buried at the central portion of the top of the piston 140, the sub-combustion chamber consists of high strength and heat resistant ceramic material such as silicon nitride and a composite material of silicon nitride and fibrous material. The top of the piston head is provided with a small central communicating orifice 131 corresponding to the fuel injection nozzle 121 provided on the cylinder body 120 and provided with a plurality of radial communicating through-orifices 132 extending radially toward the inside wall of the cylinder head liner 127. The cross-sectional shape of the opening 132a of the radial communicating orifice 132 at one end on the inside wall of the sub-chamber 130 is circular. On the other hand, the cross-sectional shape of the upper opening 132b of the radial communicating orifice 132 at the other end facing the main combustion chamber 150 is elliptical as shown in the top view of FIG. 10, the cross-sectional area of the passage of the circle and ellipse is the same or the cross-sectional area of the ellipse is smaller than that of the circular area ranging between 100 and 80%. The plurality of radial communicating orifices 132 penetrate helically in the vertical direction with the same rotational direction, therefore a flame and fuel-air mixture gushing out against the inside wall of the cylinder from the sub-combustion chamber 130 through a radial communicating orifice 132 form a swirl. A fuel collision table 133 with a trapezoidal shape having an upper plane perpendicular to the fuel injection direction from the fuel injection nozzle 121 is formed at the center of the sub-combustion chamber 130. Fuel injected against the plane is scattered radially toward the circumference of the cylinder.

The sub-combustion chamber 130 is fixed to the piston with a fixing ring 142, thermal insulation gasket 143 and air space 144 provided for thermal insulation of the sub-combustion chamber 130, and an undercover 146 is mounted under the sub-combustion chamber with interposition of thermal insulation air space 145 to prevent lube oil from splashing into the sub-combustion chamber. The cover 146 may be integrated with the piston 140.

The numeral 123 represents the intake valve for opening-closing the intake port 123a, and the numeral 124 represents the exhaust valve for opening-closing the exhaust port 124a, both valves are fixed on the bottom of the cylinder head liner 27. The fuel injection nozzle 121 for feeding fuel provided to the cylinder head 128 is covered with heat insulator 122 for thermal insulation.

The numeral 129 represents the fuel injection nozzle control solenoid valve operated in response to output from the controller 6. The numeral 151 represents the fuel injection pump, the injection pump also may be controlled by the output from the controller 6.

The engine 1 is a multiple cylinder engine; in the embodiment, it is a four-cylinder engine. The number of working cylinders of the engine 1 is controlled depending on the rotation speed and load detected by the rotation sensor 73 and load sensor 72, respectively, and the number of working cylinders is controlled so that working cylinders are operated at the maximum efficiency. The load sensor 72 detects a stroked distance of the accelerator pedal as the load. The engine 1 has a thermal insulation structure and has no cooling system for the cylinders. Such structure allows the output shaft to project outside from both ends of the engine 1 as shown in FIG. 8. Therefore two main generators 2' and 2" can be provided at the front and the rear of the engine 1. Output from the controller 6 controls the control solenoid valve 129 so that fuel is fed to only working cylinders operated depending on load and rotation speed of the engine 1.

Next, operations of the engine having such structure is described. In the late period of compression stroke when a piston 140 rises, the air is compressed to cause temperature rising and pressurization in the interior of the sub-combustion chamber 130. When this condition is prepared, methanol fuel is injected from the fuel injection nozzle 121 onto the fuel collision table 133 in the sub-combustion chamber 130, the fuel is scattered toward the circumference of the sub-combustion chamber so that fuel is readily vaporized and fired, and the fuel is ignited in the sub-combustion chamber 130. The ignited fuel gushes out from the periphery of the piston through radial communicating orifices 132, is then mixed with air in the main combustion chamber 150, and is then fired more violently. Such combustion is repeated, and the wall of the sub-combustion chamber is heated to form the heated layer. The timing of fuel injection is controlled based on signals from the rotational position sensor 71, load sensor 72, rotation sensor 73 and fuel flow rate sensor 74 of the engine 1.

After forming of the heated layer on the wall of the sub-combustion chamber 130, when methanol fuel is injected from the fuel injection nozzle 121 into the sub-combustion chamber 130 through the central communicating orifice 131, the fuel is brought into contact with pressurized air in the sub-combustion chamber 130 containing compression heat and the high temperature inside wall of the sub-combustion chamber 130. The fuel receives much heat from the heated layer and is readily vaporized and ignited. When the piston 140 is positioned around the top dead center, the sub-combustion chamber 130 is under the condition in which the sub-combustion chamber 130 is almost closed because the area for passage of the central communicating orifice 131 is small, flame generated by ignition and volume expansion and unburnt fuel-air mixture erupt through the plurality of radial communicating orifices 132 against the surrounding inside wall of the cylinder instantaneously.

Because the opening 132*b* of the radial communicating orifice 132 is elliptical with the major axis in the radial direction, the erupted combustion gas and unburnt fuel-air mixture reach the corner of the cylinder head liner 127. Because the passage of the radial communicating orifice is spiral, the combustion gas and unburnt fuel-air mixture form a swirl flow in the space between the cylinder head liner 127 and the piston 140, which space forms the main combustion chamber 150. Thus the combustion gas and unburnt fuel-air mixture are mixed with air in the main combustion chamber 150 and burn explosively to generate high pressure, which presses down the piston 140 to drive the engine.

Figure 11:
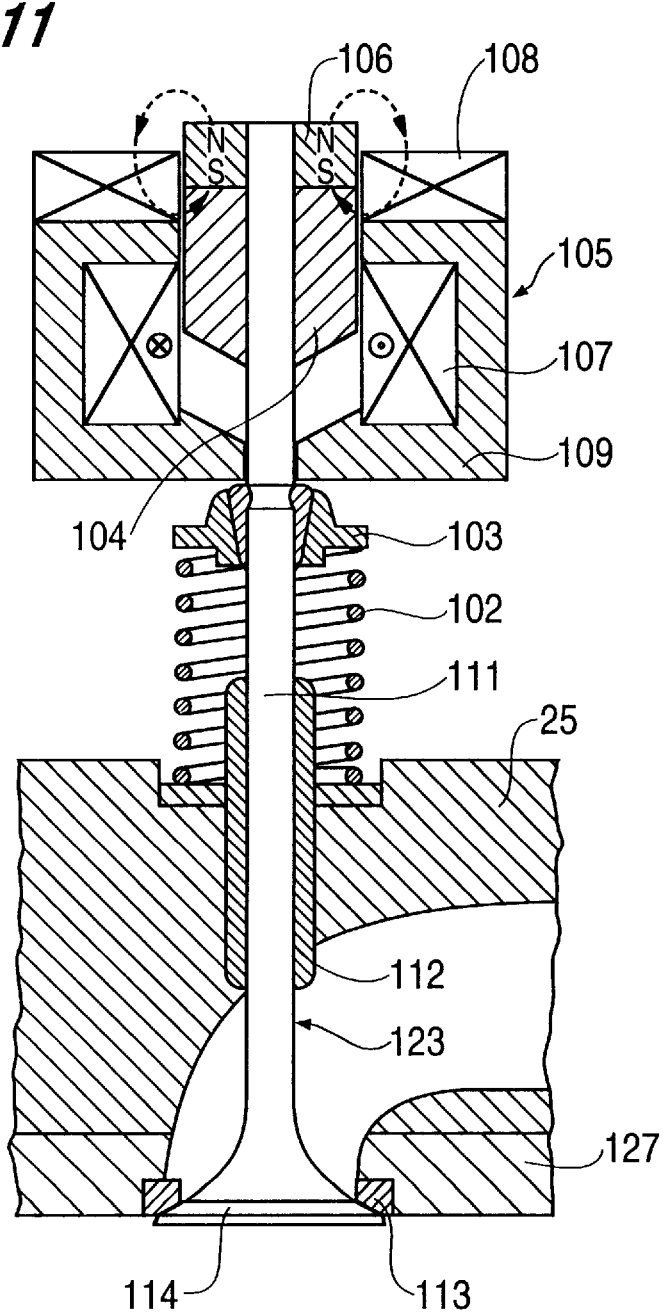
FIG. 11 is a cross-sectional view of an exhaust valve of the engine used in the present invention.
Figure 12:
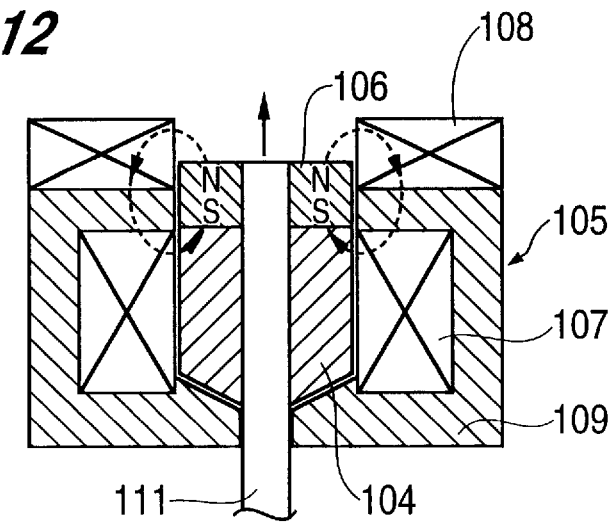
FIG. 12 is a partial cross-sectional view of an exhaust valve of the engine used in the present invention.
Figure 13:
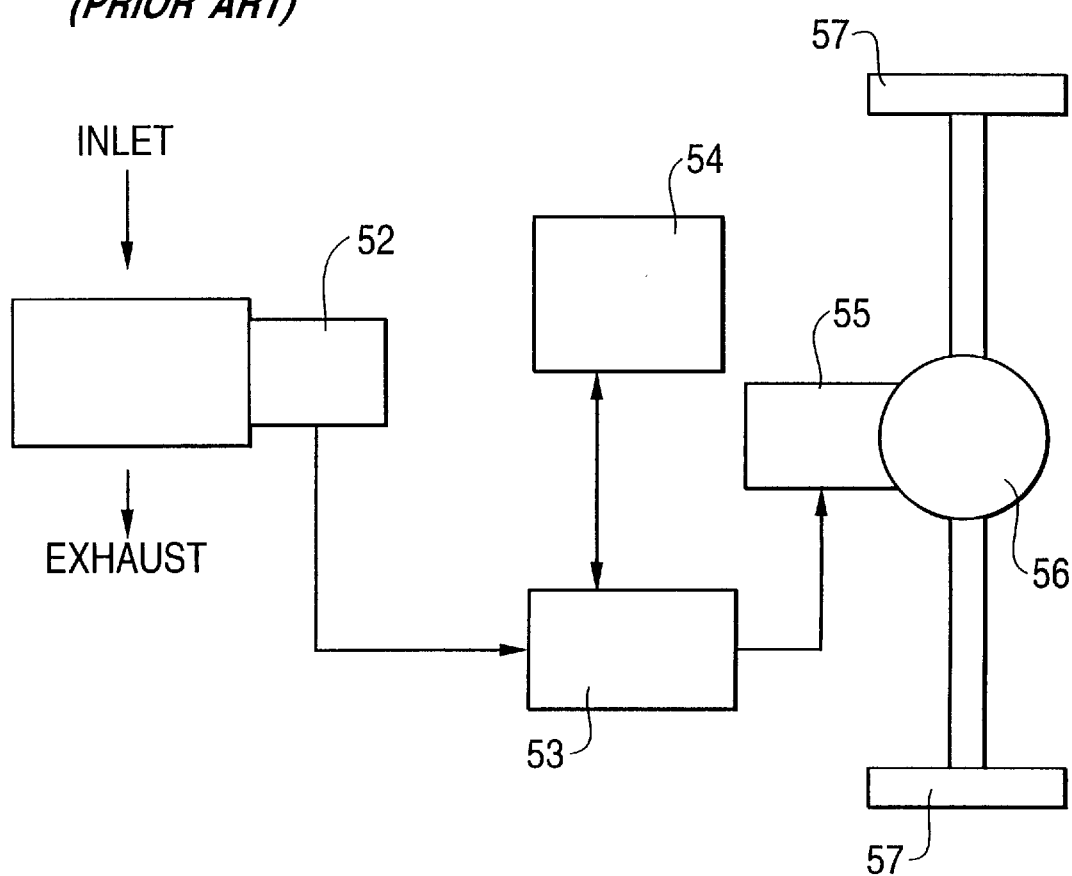
FIG. 13 is a block diagram illustrating the whole structure of a conventional hybrid elect vehicle.

The intake valve 123 and exhaust valve 124 in the embodiment are operated electro-magnetically. Various methods for electro-magnetic operation of the intake valve and exhaust valve are available. FIG. 11 is a cross-sectional view for illustrating one example of such a method, and FIG. 12 is a partial cross-sectional view for illustrating an open condition of the exemplary valve. The intake valve 123 and exhaust valve 124 are valves to open-close the intake port 123*a* and exhaust port 124*a* respectively, both valves have the almost same structure, therefore only the structure of an intake valve 123 is described herein.

In FIG. 11 and FIG. 12, the numeral 123 represents an intake valve, the stem 111 is borne by the valve guide 112, the valve element 114 sits on the valve seat 113 to close the passage when the valve is closed.

The numeral 102 represents a spring, the spring is provided between the upper seat 103 fixed at the prescribed position on the stem 111 and the cylinder head 25, the spring exerts elastic force on the intake valve 123 to force it to the upper position continuously, namely a closed valve position.

The numeral 104 represents a plunger consisting of a ferromagnetic material. The plunger is fixed at the upper position of the stem 111, and the plunger is attracted by the electromagnetic actuator 105, which will be described hereinafter, to open the intake valve 123. A ring permanent magnet 106 is provided above the plunger 104, the ring permanent magnet 106 being magnetized, for example, N pole on the top and S pole on the bottom.

The electromagnetic actuator 105 is provided with a shell type core 109, a ring exciting coil 107 for exciting the core 109, and a ring driving coil 108 provided above the core 109, and fixed at the prescribed position above the cylinder head 25. The exciting coil 107 is supplied with a current to generate electromagnetic power, then the exciting coil attracts the plunger 104 having the permanent magnet 106 downward and the driving coil 108 is supplied instantaneously with a heavy current from the capacitor 10 to form a magnetic circuit as shown in FIG. 11 with a dotted line.

As described hereinabove, when the intake valve 123 is opened, the exciting coil 107 and driving coil 108 are supplied with a current, the electromagnetic force causes attraction force for attracting the ferromagnetic plunger 104 and also causes downward driving force in the permanent magnet 106, thus the stem 111 is moved downward to open the intake valve 123.

Next, when the current supply to the exciting coil 107 is discontinued to close the intake valve 123, the plunger 104, which has been positioned downward by the attraction force, is driven upward by the elastic force of the spring 102 to close the intake valve 123, when the permanent magnet 106 positioned as shown in FIG. 12 returns upward.

Next, operations of the embodiment are described. When a driver operates the accelerator pedal to drive the vehicle, an output from the load sensor 72 is detected immediately, and stored in the controller 6. The controller 6 continues the operation of the engine 1 until the vehicle speed attains the speed corresponding to the output from the load sensor 72. During this operation, the number of working cylinder of the engine 1 is controlled. The engine 1 is controlled so that working cylinders are always operated at the optimal efficiency range, that is, when surplus power is available, the engine 1 is controlled immediately to reduce the number of working cylinders, on the other hand when the output is insufficient, the engine 1 is controlled to increase the number of working cylinders by operating resting cylinders. The intake valve 123 and exhaust valve 124 of resting cylinders are not operated, and the intake port 123*a* and exhaust port 124*a* are closed, the resting cylinders are served for pumping operation to reduce the load on working cylinders.

A turbo-charger 3 is inserted in the exhaust system of the engine 1, and another turbine 4 is fixed downstream from the turbo-charger 3. When the engine is rotated at high speed and high temperature exhaust gas is exhausted at a high rate, two turbines are rotated by exhaust energy of the exhaust gas. The output of the turbines is used to drive the motor-generator 3*a* as a generator to recover the output, and also excess exhaust energy drives the turbine 4, and the turbine 4 drives the sub-generator 5 to recover additional exhaust energy.

On the other hand, the engine 1 is fueled with methanol or ethanol. The heating value of this alcohol fuel is half of fossil fuels such as gasoline and light oil, therefore more fuel should be fed than is the case of a fossil fuel. For this reason, alcohol fuel absorbs a large amount of heat as heat of vaporization from the combustion chamber compared with fossil fuel. In the embodiment of the invention, the sub-combustion chamber 130 is structured with thermal insulation. The heated layer is formed on the wall. Fuel injected onto the fuel collision table 133 of the sub-combustion chamber 130 is scattered and collided against the wall of the sub-combustion chamber 130. Therefore, methanol or ethanol fuel absorbs a large amount of heat from the wall and vaporizes instantaneously. The wall of the sub-combustion chamber 130 is provided with efficient thermal insulation, then upon burning internally, absorbed heat as heat of vaporization is supplemented, and the heated layer is formed on the wall again.

The main generators 2' and 2" are rotated by the engine 1. An output is fed to the controller 6 and then to the motors 8. The wheels 9 are operated, then the vehicle is accelerated. The vehicle speed is always monitored by the controller 6. The speed is compared with a speed equivalent to the stroked distance of the accelerator pedal. When both speeds become the same speed, the controller 6 reduces the power supply to the motors 8 to the power level sufficient for only maintaining the vehicle speed at a current speed including supplementing for various frictional resistance losses. Naturally, output generation of the main generators 2' and 2" decreases and output of the engine 1 also decreases. Consequently, output of the cylinders decrease, and the efficiency of the cylinders decreases. The controller 6 detects the decrease, operates the calculation that the output of the main generator 2' and 2" is divided by the maximum output from a single cylinder operated under the maximum efficiency to determine the required number of working cylinders, compares the current number of working cylinders with the required number of working cylinders, and if the current number of working cylinders is larger than the required number of working cylinders, some working cylinders are stopped. To stop the operation of cylinders, the operation of the intake valve and exhaust valve of the cylinders to be stopped may be halted.

When a vehicle is accelerated and moved at a high speed, the engine 1 exhausts a large amount of high temperature exhaust gas. Under such a condition, the turbo-charger 3 drives the compressor to operate the supercharging. In addition, the motor-generator 3a of the turbo-charger 3 functions as a generator to recover exhaust energy as electric power. Also the sub-generator 5 recovers exhaust energy as electric power. These recovered electric power is sent to the controller 6 and distributed to the motors 9 as driving power, and when surplus power is still available, the electric power is sent to the battery 11, a lead-acid battery, for storage. However, when braking, the generators generate a large current instantaneously, the lead-acid battery cannot accept such instantaneous large amounts of electric power for charging, and instead, the surplus power is sent to the capacitor 10 and the capacitor 10 instantaneously absorbs the surplus power for storage. The capacity of the capacitor 10 is not as large as that of the battery 11. The controller 6 for controlling charging and discharging is operated upon completion of full charging of the capacitor 10 to transfer the instantaneously charged power in the capacitor 10 with redundancy to the battery, and the charge in the capacitor 10 is returned to about zero and the capacitor 10 is ready for the next instantaneous charging operation.

When the vehicle is climbing up a steep slope, the main generators 2' and 2" are heavily loaded. Also the engine 1 is heavily loaded, the rotation speed of the engine 1 slows down in spite of full operation. In such a condition, the main motors 2' and 2" supply electric power to the motor-generator 3a of the turbo-charger 3 to operate the motor-generator 3a as a motor. The motor-generator 3a drives the compressor to operate supplemental supercharging. However in such a condition, surplus power from the main generators 2' and 2" is not available for loads other than power to drive the motors 8. In such a case, the controller 6 controls the battery 11 to supply power to the motor-generator 3a of the turbo-charger 3, then the turbo-charger 3a is operated for supercharging. When the motor-generator 3a needs a feed of instantaneous current, the controller 6 transfers power from battery 11 to the capacitor 10, the power is supplied instantaneously from the capacitor 10 to the motor-generator 3a. When the vehicle is driven around curves, the rotation speed of the wheel is different between the inner wheel and outer wheel. The rotation speed of the motor 8 coupled with the wheel 9 is adjusted so as to smoothly rotate based on learning of the rotation of individual wheels for curved driving.

As described hereinbefore, in this embodiment, cylinders of the engine, pistons, and sub-combustion chambers are provided with a thermal insulation structure. Heat sufficient for evaporation of fed fuel is held in the sub-combustion chambers. A sub-combustion chamber having a central communicating orifice at the center of the piston head is formed. A fuel collision table is formed in the sub-combustion chamber. A plurality of radial communicating orifices for jetting flame from the sub-combustion chamber toward the cylinder is provided. Burning is easy even with use of a low pressure fuel injection mechanism, therefore, simply structured solenoid valve type fuel injection nozzles and solenoid valve type fuel injection pumps can be used. Alcohol fuel such as methanol and ethanol is burnt smoothly, the fuel injection timing is adjusted to the optimal timing depending on the load, the number of working cylinders is adjusted depending on load to operate the engine at the optimal fuel consumption, and the amount of hazardous substance in the exhaust gas is minimized. The engine of the present invention needs no engine cooling mechanism, no heavy weight gear box and no clutch mechanism. The weight of the whole vehicle is reduced compared with conventional vehicles, and the fuel consumption is improved also in terms of the light weight.

What is claimed is:

1. A hybrid electric vehicle comprising:

an engine having an exhaust system, a main generator driven by said engine for generation of power, dynamo-electric machines coupled with a drive shaft of a pair of wheels driven by the power from said main generator, and a controller for controlling said dynamo-electric machines, combustion chambers formed in said engine and consisting of ceramic material and a thermal insulation member with an insulation layer provided on an outside periphery of a wall of the exhaust system, a turbo-charger provided in the exhaust system, an energy recovery turbine provided downstream from said turbo-charger, sub-generators coupled with shafts of said turbo-charger and energy recovery turbine, respectively, and a controller for merging output electric power obtained from said sub-generators and for driving the hybrid electric vehicle.

2. A hybrid electric vehicle as claimed in claim 1, further comprising:

a heater for heating fuel provided in the exhaust system of the engine, a temperature sensor fixed to the engine, a catalyst for reforming a fed fuel to a fuel with a higher cetane number than that of the fed fuel provided downstream from said heater, and a power supply control member for supplying electric power to the heater in response to a signal from the temperature sensor when the temperature of the engine is low.

3. The hybrid electric vehicle as claimed in claim 2, wherein the crank shaft of the engine and a speed increasing power transmission member are connected so that the speed increasing power transmission member is rotated at a speed twice that of the crank shaft, the main generator is coupled with a shaft which is rotated in a direction reverse to that of the crank shaft, wherein a rotor of said speed increasing transmission member is unbalanced mechanically, and the main generator is provided so that the unbalance of the crank shaft of a four-cylinder engine is compensated.

4. A hybrid electric vehicle comprising:

an engine having a crank shaft and an exhaust system, a main generator driven by said engine for generation of power, dynamo-electric machines coupled with a drive shaft of a pair of wheels driven by the power from said main generator, and a controller for controlling said dynamo-electric machines, combustion chambers formed in said engine and consisting of ceramic material and a thermal insulation member with an insulation layer provided on an outside periphery of a wall of the exhaust system, a turbo-charger provided in the exhaust system, an energy recovery turbine provided downstream from said turbo-charger, sub-generators coupled with shafts of said turbo-charger and energy recovery turbine, respectively, a controller for merging output electric power obtained from said sub-generators and for driving the hybrid electric vehicle, a plurality of second main generators provided respectively on both ends of the crank shaft, and a second controller for merging outputs from the second main generators and the energy recovery turbine and for operating the dynamo-electric machine coupled with the drive shaft of the vehicle as a motor.

5. The hybrid electric vehicle as claimed in claim 4, wherein the sub-combustion chamber provided on the piston head of the engine is formed on the central portion of the piston head.

6. The hybrid electric vehicle as claimed in any of claims 1, 2 or 4, wherein said main generator has a planetary gear mechanism and a peripheral gear, and a generation mechanism is provided on the peripheral gear.

7. The hybrid electric vehicle as claimed in any of claims 1, 2 or 4, wherein said main generator has a planetary gear mechanism with a peripheral gear and an inner speed increasing gear, and generation mechanisms are provided on the peripheral gear and the inner speed increasing gear, respectively.

8. The hybrid electric vehicle as claimed in any of claims 1, 2 or 4, further comprising a device to detect the temperature of the engine, throttle an exhaust gas passage when the temperature is low, and introduce combustion gas from an exhaust hole to the cylinder.

\* \* \* \* \*